(12) United States Patent
Mahoutian et al.

(10) Patent No.: US 12,344,563 B2
(45) Date of Patent: Jul. 1, 2025

(54) METHOD OF MANUFACTURING CONCRETE PRODUCTS INCLUDING POST-HARDENING TREATMENT

(71) Applicant: CARBICRETE INC., Montreal (CA)

(72) Inventors: Mehrdad Mahoutian, Montréal (CA); Hucheng Qi, London (CA)

(73) Assignee: CARBICRETE INC., Montreal (CA)

( * ) Notice: Subject to any disclaimer, the term of this patent is extended or adjusted under 35 U.S.C. 154(b) by 0 days.

(21) Appl. No.: 18/195,987

(22) Filed: May 11, 2023

(65) Prior Publication Data

US 2023/0365473 A1 Nov. 16, 2023

Related U.S. Application Data

(60) Provisional application No. 63/364,504, filed on May 11, 2022.

(51) Int. Cl.
  *C04B 40/02* (2006.01)
  *C04B 28/08* (2006.01)
  *C04B 40/00* (2006.01)

(52) U.S. Cl.
  CPC ........ *C04B 40/0231* (2013.01); *C04B 28/082* (2013.01); *C04B 40/0082* (2013.01)

(58) Field of Classification Search
  CPC .............. C04B 40/0231; C04B 28/082; C04B 40/0082; C04B 28/02
  See application file for complete search history.

(56) References Cited

U.S. PATENT DOCUMENTS 5,935,317 A * 8/1999 Soroushian ......... C04B 40/0231
  106/819

FOREIGN PATENT DOCUMENTS

| CA | 2942401 A1 | 9/2015 | |
| CA | 3130238 A1 | 11/2021 | |
| CN | 111217566 A * | 6/2020 | ............. C04B 28/04 |

OTHER PUBLICATIONS

International Search Report for corresponding application PCT/CA2023/050643 filed May 11, 2023; Mail date Jul. 18, 2023.
Written Opinion for corresponding application PCT/CA2023/050643 filed May 11, 2023; Mail date Jul. 18, 2023.

* cited by examiner

*Primary Examiner* — Anthony J Green
(74) *Attorney, Agent, or Firm* — CANTOR COLBURN LLP (57) ABSTRACT

A method of manufacturing a concrete product includes mixing a composition including a binder, an aggregate, and water to produce a concrete mixture, and imparting a form to the concrete mixture to provide a formed intermediate. The formed intermediate is carbon cured to obtain a cured intermediate. A post-hardening treatment to the cured intermediate is done by exposing the cured intermediate to a temperature above an ambient temperature to obtain the concrete product.

20 Claims, 4 Drawing Sheets

METHOD OF MANUFACTURING CONCRETE PRODUCTS INCLUDING POST-HARDENING TREATMENT

CROSS-REFERENCE TO RELATED APPLICATIONS

This application claims priority to U.S. patent application No. 63/364,504 file May 11, 2022, the entire contents of which are incorporated herein by reference.

TECHNICAL FIELD

This disclosure relates generally to concrete products and, more particularly, to systems and methods used for manufacturing such concrete products.

BACKGROUND

The traditional manufacture of concrete products includes mixing a dry mixture, which may include a cement and aggregate, with water. The resultant intermediate may undergo a conditioning step in which some of the water it contains is evaporated. The conditioned intermediate product subsequently undergoes a separate curing step, in order to obtain the final concrete product. Continuous improvements to such concrete products and their methods of manufacture are sought, particularly to render the manufacturing process more environmentally friendly and/or to improve characteristics of the resultant concrete products.

SUMMARY

There is accordingly provided a method of manufacturing a concrete product, comprising: mixing a composition including a binder, an aggregate, and water to produce a concrete mixture; imparting a form to the concrete mixture to provide a formed intermediate; carbon curing the formed intermediate to obtain a cured intermediate; and performing a post-hardening treatment to the cured intermediate by exposing the cured intermediate to a temperature above an ambient temperature to obtain the concrete product.

The method defined above and described herein may further include one or more of the following features, in whole or in part, and in any combination.

In certain aspects, exposing of the cured intermediate to the temperature above the ambient temperature includes exposing the cured intermediate to the temperature being at least 30 degrees Celsius.

In certain aspects, exposing of the cured intermediate to the temperature includes exposing the cured intermediate to the temperature being from at least 40 to 150 degrees Celsius.

In certain aspects, exposing of the cured intermediate to the temperature includes exposing the cured intermediate to the temperature being from at least 80 to 100 degrees Celsius.

In certain aspects, exposing of the cured intermediate to the temperature includes increasing a temperature of a curing chamber containing the cured intermediate at a rate ranging from 20 to 120 degrees Celsius per hour.

In certain aspects, the temperature inside the curing chamber is maintained above at least 30 degrees Celsius.

In certain aspects, exposing of the cured intermediate to the temperature above the ambient temperature includes exposing the cured intermediate to an environment having a relative humidity of from 10% to 90%.

In certain aspects, exposing of the cured intermediate to the temperature above the ambient temperature includes exposing the cured intermediate to the temperature for from 1 hour to 72 hours.

In certain aspects, exposing of the cured intermediate to the temperature above the ambient temperature includes exposing the cured intermediate to the temperature for from at least 6 hours.

In certain aspects, exposing of the cured intermediate to the temperature above the ambient temperature is performed immediately after the carbon curing.

In certain aspects, the cured intermediate is stored before the exposing of the cured intermediate to the temperature above the ambient temperature.

In certain aspects, the method includes moisturizing the cured intermediate before the performing of the post-hardening treatment.

In certain aspects, the moisturizing comprises one of: submerging the cured intermediate in water; spraying the cured intermediate with water; and misting the cured intermediate with water.

In certain aspects, the moisturizing is performed concurrently with the performing of the post-hardening treatment.

In certain aspects, the moisturizing is performed for 0.5 to 48 hours.

In certain aspects, the method further includes conditioning the formed intermediate.

In certain aspects, providing of the composition includes providing the composition including the binder including one or more of fly ash, calcinated shale, silica fume, zeolite, ground granulated blast furnace slag, limestone powder, hydraulic cements, and non-hydraulic cements.

In certain aspects, providing of the composition includes providing the composition with the binder including slag, the slag including one or more of a steel slag, a stainless steel slag, a basic oxygen converter sludge, a blast furnace sludge, a by-product of zinc production, a by-product of iron production, and a by-product of copper production.

In certain aspects, providing the composition includes adding admixtures and/or additives to the composition.

There is also provided a method of manufacturing a concrete product, comprising: obtaining a carbon cured intermediate; and performing a post-hardening treatment to the carbon cured intermediate by exposing the carbon cured intermediate to a temperature above an ambient temperature to obtain the concrete product.

The method defined above and described herein may further include one or more of the following features, in whole or in part, and in any combination.

In certain aspects, exposing the carbon cured intermediate to the temperature above the ambient temperature includes exposing the carbon cured intermediate to the temperature being at least 30 degrees Celsius.

In certain aspects, exposing the carbon cured intermediate to the temperature includes exposing the carbon cured intermediate to the temperature being from at least 40 to 150 degrees Celsius.

In certain aspects, exposing the carbon cured intermediate to the temperature includes exposing the carbon cured intermediate to the temperature being from at least 80 to 100 degrees Celsius.

In certain aspects, exposing the carbon cured intermediate to the temperature includes increasing a temperature of a curing chamber containing the carbon cured intermediate at a rate ranging from 20 to 120 degrees Celsius per hour.

In certain aspects, the temperature inside the curing chamber is maintained above at least 30 degrees Celsius.

In certain aspects, exposing the carbon cured intermediate to the temperature above the ambient temperature includes exposing the carbon cured intermediate to an environment having a relative humidity of from 10% to 90%.

In certain aspects, exposing the carbon cured intermediate to the temperature above the ambient temperature includes exposing the carbon cured intermediate to the temperature for from 1 hour to 72 hours.

In certain aspects, exposing the carbon cured intermediate to the temperature above the ambient temperature includes exposing the carbon cured intermediate to the temperature for at least 6 hours.

There is further provided a method of manufacturing a concrete product, comprising: imparting a form to a concrete mixture to provide a formed intermediate, the concrete mixture including a binder, an aggregate, and water; carbon curing the formed intermediate to obtain a carbon cured intermediate; and moisturizing the cured intermediate; and performing a post-hardening treatment to the carbon cured intermediate, by exposing the carbon cured intermediate to a temperature above an ambient temperature to obtain the concrete product.

The method defined above and described herein may further include one or more of the following features, in whole or in part, and in any combination.

In certain aspects, the moisturizing comprises one of: submerging the cured intermediate in water; spraying the cured intermediate with water; and misting the cured intermediate with water.

In certain aspects, the moisturizing is performed prior to the performing the post-hardening treatment.

In certain aspects, the moisturizing is performed concurrently with the performing of the post-hardening treatment.

In certain aspects, the moisturizing is performed for 0.5 to 48 hours.

In certain aspects, the exposing of the carbon cured intermediate to the temperature above the ambient temperature includes exposing the carbon cured intermediate to a temperature of at least 30 degrees Celsius.

In certain aspects, the method further includes exposing the carbon cured intermediate to a temperature of from 40 to 150 degrees Celsius.

In certain aspects, the method further includes exposing the carbon cured intermediate to a temperature of 80 to 100 degrees Celsius.

In certain aspects, exposing the carbon cured intermediate to the temperature further comprises increasing the temperature at a rate ranging from 20 to 120 degrees Celsius per hour.

In certain aspects, exposing the carbon cured intermediate to the temperature further comprises exposing the carbon cured intermediate to the temperature for from 1 hour to 72 hours.

In certain aspects, the carbon cured intermediate is exposed to the temperature for at least 6 hours.

Many further features and combinations thereof concerning the present improvements will appear to those skilled in the art following a reading of the instant disclosure.

DETAILED DESCRIPTION

Introduction

There remains growing interest worldwide to reduce the environmental footprint of precast concrete. Carbonation curing technology is among the most promising solutions. During carbonation curing, precast concrete hardens mainly through the so-called carbonation reaction which happens between carbon dioxide and the oxides, and/or hydroxide of calcium and/or magnesium, with the existence of water. Under appropriate raw material selection, mix design and process control, carbonated precast concrete can be as strong and durable as traditional precast concrete, and suitable for a variety of applications.

Although carbonated precast concrete has many advantages, its strength development after carbonation curing may be a limiting factor for some applications. It may therefore be advantageous to improve the strength of carbonated precast concrete after carbonation curing. The lack or limited strength development of carbonated precast concrete may be the result of the thick coverage of carbonation reaction products, such as carbonates of calcium and/or magnesium, — on binder particles. Another factor may be the change of pH surrounding the unreacted part of binder particles after carbonation curing. The thick coverage of carbonates and lowered pH value may hinder the potential hydration of cementitious binders after carbonation hardening. The lack or negligible strength development after carbonation curing is even more pronounced when a considerable amount of ordinary Portland cement or similar cementitious binder is replaced by materials with poor or no hydraulic activity. These replacement materials include slags generated from metal processing, ashes generated from power generation or waste incineration, and so on. The inclusion of such replacement materials may help improve the environmental footprint of the concrete and make the concrete a greener product. Because of the restricted strength gain after carbonation curing, carbonated precast concrete often contains a greater binder content than traditional precast concrete at the same strength grade, thus increasing the material cost for carbonated precast concrete and reducing its sustainability. It would thus be desirable, for some applications, to improve the strength development of precast carbonated concrete, particularly a precast carbonated concrete that contains a replacement to the traditional cementitious binder for example slags.

Traditionally, Portland cement has been used as the binder in concrete production where curing is done using heat and steam. However, the present methods can replace at least a portion of the Portland cement with greener alternatives such as slags. Indeed, this substitution can be advantageously performed because the present methods can still provide satisfactory post-hardening strength even when a portion or a totality of the cement (e.g. Portland cement) is replaced by other waste materials (such as slags).

Increasing binder content is a common and accepted practice in the production of carbonated precast concrete when greater strength and durability, such as freeze-thaw resistance, are desired. Because the binder is the most expensive ingredient among the main raw materials used in the production of carbonated precast concrete, increasing binder content for a higher performance often results in higher material cost. The present disclosure provides a post-hardening treatment process that can either improve the performance of carbonated precast concrete without increasing its binder content or reduce the binder content of carbonated precast concrete without sacrificing its strength and durability. In either way, a significant saving in material cost can be achieved by implementing the post-hardening treatment process described herein in the manufacture of carbonated precast concrete with desired performance. Moreover, in some embodiments, as explained above, the present post-hardening treatment process is especially suitable for treating carbonated precast concrete made of a binder containing a considerable amount of non-traditional binders sourced from industrial waste materials as cement replacement. This may be advantageous for carbonated precast concrete from an environmental protection perspective, on top of its already low carbon footprint.

Examples of precast concrete products which may be produced using the described post-hardening treatment process herein include, but are not limited to, concrete pipes, traffic barriers, walls including retaining walls, boxes including modular boxes, culverts, tiles, pavers, foundations, slabs including hollow core slabs, patio slabs, steps, curbs, concrete masonry units, beams, floors, columns, manholes, sewage pipes, railroad ties, and other precast concrete products.

Before carbonated precast concrete is treated with the disclosed post-hardening treatment method, it can be produced with the known art. As given in the examples, unreinforced carbonated precast concrete can be made with 20-50% by weight of binder. Precast concrete is prepared with a dry-cast method, i.e., water is added to offer concrete mixture a satisfactory workability but with a slump close to zero. After forming and consolidation, precast concrete is demolded and then conditioned to lose 20-80% of its initial moisture, before carbonation curing is executed in a pressure chamber with $CO_2$ gas at 99.9% concentration and 6-15 psi pressure for 4-24 hours. However, the production of carbonated precast concrete suitable for the described post-hardening treatment is not limited by the exemplary methods. For example, carbonated precast concrete can also be made with a binder content as low as 10% by weight, a wet-cast manufacturing method, a $CO_2$ pressure in the range of 0.1-1200 psi with $CO_2$ in a gaseous or liquid (supercritical) state at a concentration as low as 10%, a carbonation curing duration as short as a few minutes or longer than 24 hours, and a conventional reinforcing method. In addition, the conditioning process can be executed prior to demolding. Additionally, this conditioning process can be avoided when the pressure of $CO_2$ or the permeability of consolidated precast concrete (such as pervious concrete) is sufficiently high, or the duration of carbonation curing is sufficiently long, or a simultaneous conditioning and carbonation curing process is applied. Furthermore, a precuring step may be added before demolding, during which precast concrete gains a strength high enough to maintain its shape and resist the damaging forces during the demolding and other manufacturing processes prior to carbonation curing.

The density of carbonated precast concrete subject to the described post-hardening process can be normal as shown in the examples presented below. However, lightweight and heavy weight carbonated precast concrete can also be treated with the described post-hardening method. The aggregates for carbonated precast concrete production can be normal weight, lightweight, and heavy weight of natural, man-made, or recycled origin. Their gradations and dosages in the mix design follow the general practice of traditional precast concrete production. Similarly, chemical and mineral additives, such as pigment, air entraining admixture, water reducing admixture, water repellent mixture, fiber, accelerator, etc., and their dosages used for manufacturing carbonated precast concrete can also follow the general rules of traditional precast concrete production.

Curing System

Figure 1:
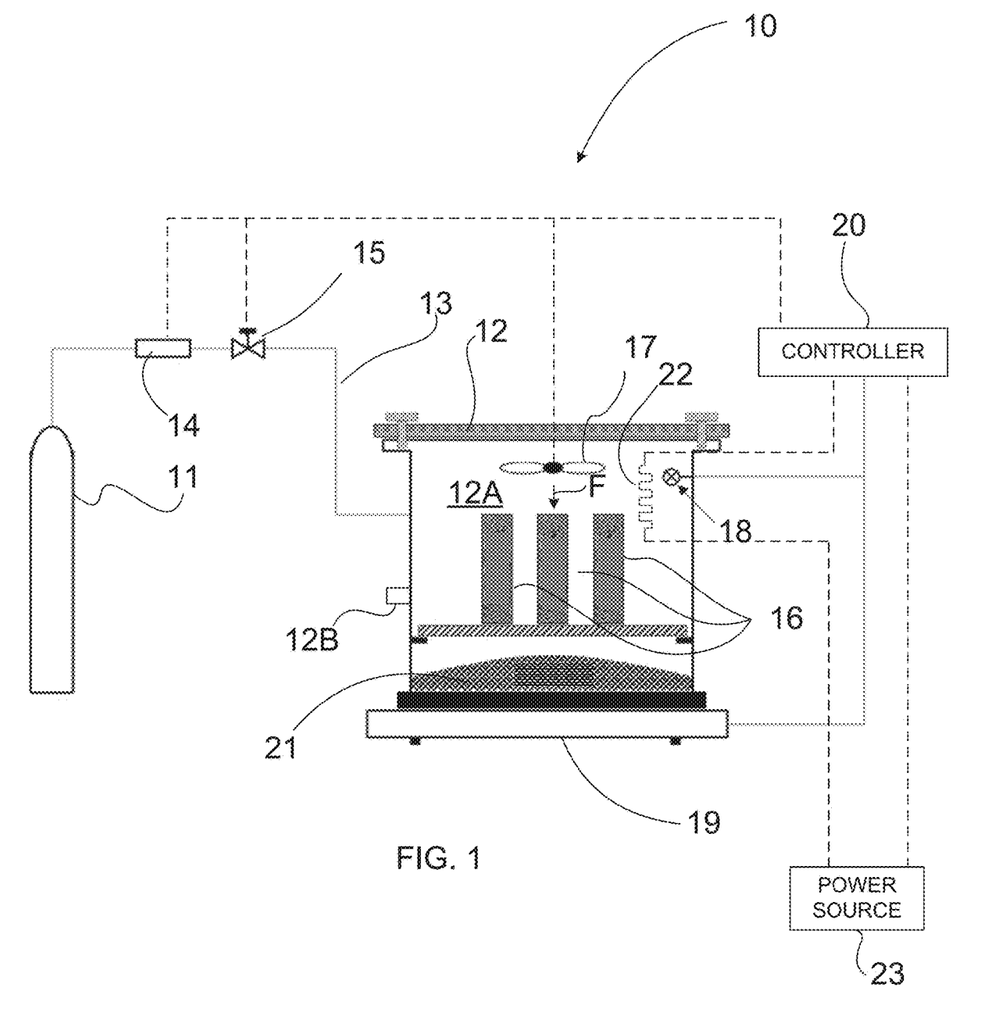
FIG. 1 is a schematic view of a system used for curing, conditioning, and hardening a concrete product.

Referring now to FIG. 1, an exemplary system for conditioning and curing a concrete product is shown at 10. The system 10 includes a source of carbon dioxide 11, which may be a reservoir or tank, pneumatically connected to an enclosure 12 via a line 13. In the embodiment shown, the system 10 includes a heater 14 for heating the carbon dioxide as it flows from the source of carbon dioxide 11 to the enclosure 12. In the present configuration, the system 10 includes a valve 15 that may be selectively open or closed to allow or restrict the flow of carbon dioxide toward the enclosure 12.

The enclosure 12 defines an inner space or chamber 12A that is sized to accept the plurality of concrete products 16 to be cured. In the embodiment shown, the enclosure 12 includes top bottom and side walls interconnected to one another in an airtight manner. In the context of the present disclosure, "airtight" implies that there is little to no leakage of gas through the enclosure 12 at a pressure differential the enclosure 12 is subjected to. The pressure differential corresponds to a difference between the pressure inside the enclosure 12 and an ambient pressure outside the enclosure 12. The enclosure 12 may be structurally designed to withstand a pressure differential created by a greater pressure of the carbon dioxide inside the enclosure 12 than an atmospheric pressure outside the enclosure 12. A blower 17 may be located in the chamber 12A of the enclosure 12 and is operable to generate an airflow F that may accelerate the conditioning and/or curing process.

In some embodiments, the enclosure 12 may be used to cure the concrete products 16 using a low-pressure curing. In the context of the present disclosure, the expression "low-pressure" implies pressures that exceed the ambient pressure by at most 10% of the ambient pressure. More detail about low-pressure curing are presented in U.S. patent application Ser. No. 17/581,320 filed Jan. 21, 2022, the entire content of which is incorporated herein by reference. The enclosure 12 may be a deployable structure (e.g. bag).

The system 10 may further include one or more sensors 18, which may include one or more of a temperature sensor and a humidity sensor. The temperature sensor and humidity sensor 18 are operatively connected to the chamber 12A and are operable generate one or more signals indicative of a temperature and a humidity level inside the enclosure 12. A scale or balance 19 may support the enclosure 12 and is used to measure a weight variation of the concrete products 16 during the conditioning and curing phase. The balance 19 may send a signal indicative of a weight of the enclosure 12 containing the concrete products 16. More specifically, water content of the concrete products 16 is expected to evaporate during the conditioning and curing phase. The balance 19 may measures this weight variation and may be used to determine whether the conditioning and curing process is completed.

In the embodiment shown, the system 10 includes a controller 20 that may be operatively connected to the temperature and humidity sensor 18, to the balance 19, to the heater 14, to the blower 17, and to the valve 15. The controller 20 may therefore independently control the injection of carbon dioxide through the valve 15 and the actuation of the blower 17. In the embodiment shown, the controller 20 includes a computing device 400 such as the one shown and described below with reference to FIG. 4. The controller 20 may act as a data logger to save temperatures, weights, pressures, etc. data points during the conditioning and curing process. The controller 20 is operable to receive data from the temperature and humidity sensor 18 and from the balance 19; and to control operating parameters of the heater 14, the valve 15, and the blower 17. These operating parameters may include, for instance, a temperature of the heater 14, whether the valve 15 should be opened, closed, or at an intermediate position to control a flow of carbon dioxide through the valve 15, a rotational speed of the blower 17, and so on.

In some embodiments, the conditioning phase occurs while concrete products 16 are located inside the enclosure 12. During the conditioning phase, it is expected that water would be released from the concrete product 16. Since the enclosure 12 is closed to an environment outside the enclosure 12, it may be desirable to absorb the extracted humidity from the concrete product. In the present case, a desiccant material 21 is located inside the enclosure 12 and is used to absorb excess humidity. A desiccant material may be a hygroscopic material that is used to induce or sustain a state of dryness in its vicinity. These desiccant materials may absorb water. The desiccant material may, in one particular example, include silica gel. Desiccant materials may be in forms other than solid, and may work through other principles, such as chemical bonding of water molecules. Desiccant materials may include, in any combinations, activated charcoal, calcium sulfate, calcium chloride, zeolites, and so on. The desiccants materials may be adsorbent materials as opposed to absorbent material. An absorbent material would contain the water by allowing the water to penetrate through it. An absorbent material may be porous and the water may be absorbed by penetrating porosities of the absorbent material. An adsorbent material will stick to water molecules. In other words, the water will be detained by the adsorbent material by being adhered to a surface of the adsorbent material. The adsorbent material may attract moistures and hold it like a magnet on its surface. It will be understood that any means able to extract humidity from the enclosure 12 during the simultaneous curing and conditioning may be used. For instance, a de-humidifier, an air conditioning, and any other suitable means may be used.

In the embodiment shown, the system 10 may include a heating element 22 located within the chamber 12A for increasing a temperature inside the chamber 12A to perform a post-hardening process, which will be described further below. The heating element 22 may be operatively connected to a power source 23 and to the controller 20, which may control operation of the heating element 22. It will be appreciated that any suitable means used for increasing a temperature within the chamber 12A are contemplated. For instance, chemical components generating an exothermic reaction when mixed may be disposed inside the chamber 12A. The chamber 12A may be heated by heating walls of the enclosure 12. This may be done with gas, electricity, induction, hot water, and so on.

Method

There is provided a method of manufacturing a concrete product. The inventors of the present disclosure have surprisingly found that, after a post-hardening heat treatment, the strength of precast carbonated concrete is significantly improved. A second unexpected finding was determining that the strength of carbonated precast concrete can be further improved by performing a wetting/moisturizing step, such as water absorption, before the post-hardening heat treatment. After completing the wetting step and heat treatment it was found that carbonated precast concrete has an improved strength when compared to the counterpart right after carbonation curing.

The current disclosure also includes a post-hardening treatment process to strengthen the already carbonated precast concrete. During this process, precast concrete that has already been subjected to carbonation curing is exposed to a heated environment. In other words, carbonated precast concrete is baked at a temperature above the ambient temperature. The post-hardening treatment can be executed in the carbon dioxide curing chamber or alternatively it can be performed in another suitable enclosure. The post-hardening treatment can be executed on carbonated precast concrete immediately after carbonation curing is completed or alternatively it can be performed after carbonation curing is completed for an unlimited period. The temperature range during the post-hardening treatment may be 40-150° C., with higher temperature generally being advantageous for the performance improvement of carbonated precast concrete. The relative humidity range during the post-hardening process may be 10-90%. The duration of the post-hardening treatment may be from about 1 hour to about 72 hours. Detailed post-hardening treatment conditions are dictated by concrete mix proportions, type of raw materials and desired performance.

It is believed that the durability, such as freeze-thaw resistance, of a strengthened precast concrete could also be improved with this post-hardening step. Therefore, this added step may enhance the mechanical properties and durability of carbonated precast concrete and/or reduce the material cost in its production.

In the context of the present disclosure, the expression "about" implies variations of plus or minus 10%.

Figure 2:
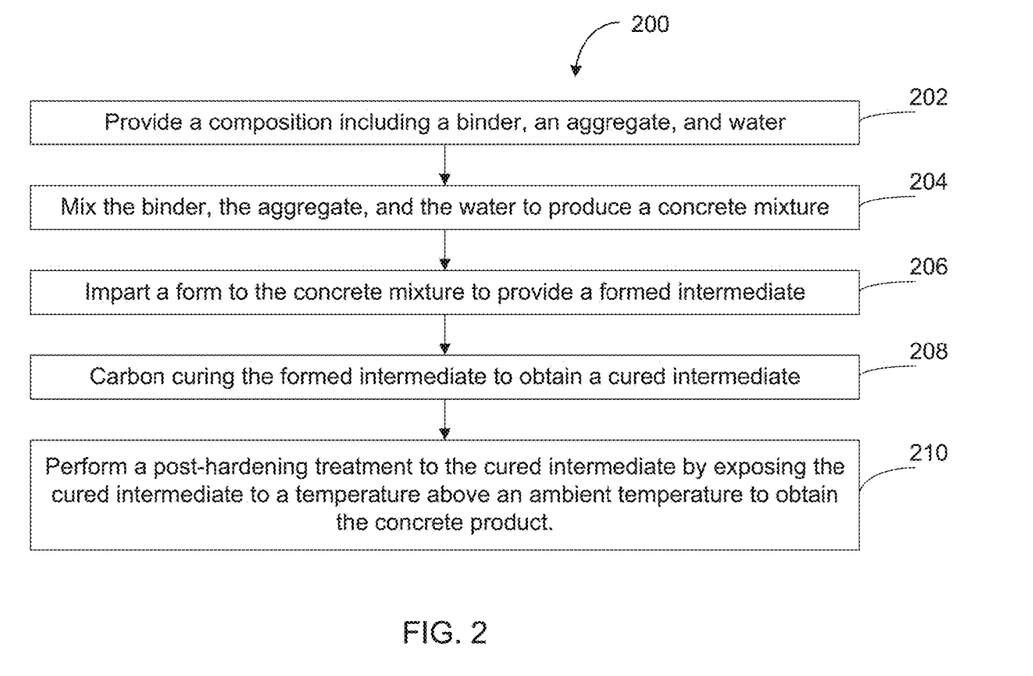
FIG. 2 is a flowchart illustrating steps of a method of manufacturing a concrete product.

Referring now to FIG. 2, a method of manufacturing a concrete product is shown at 200. The method includes providing a composition including a binder, an aggregate, and water at 202; mixing the binder, the aggregate, and the water to produce a concrete mixture at 204; imparting a form to the concrete mixture to provide a formed intermediate at 206; carbon curing the formed intermediate to obtain a cured intermediate at 208; and performing a post-hardening treatment to the cured intermediate by exposing the cured intermediate to a temperature above an ambient temperature to obtain the concrete product at 210.

Figure 3:
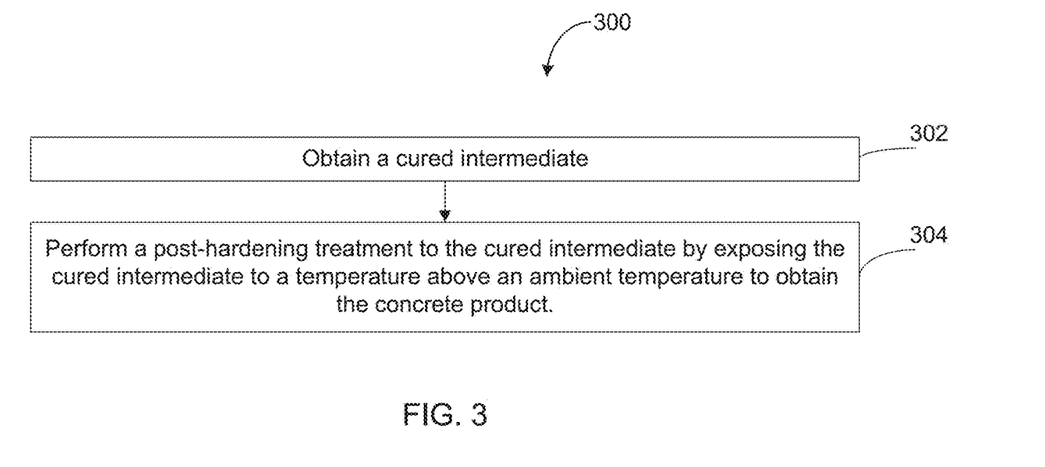
FIG. 3 is a flowchart illustrating steps of another method of manufacturing a concrete product.

Another method of manufacturing a concrete product is shown at 300. The method 300 includes obtaining a cured intermediate at 302; and performing a post-hardening treatment to the cured intermediate by exposing the cured intermediate to a temperature above an ambient temperature to obtain the concrete product at 304.

Mixture & Forming

In the embodiment shown, the step 202 of providing the composition may include providing a composition being free of a slag. The providing of the composition at 202 may include providing the composition including the binder including one or more of fly ash, calcinated shale, silica fume, zeolite, ground granulated blast furnace slag, limestone powder, hydraulic cements, and non-hydraulic cements. The providing of the composition at 202 may include providing the composition with the binder including slag, the slag including one or more of a steel slag, a stainless steel slag, a basic oxygen converter sludge, a blast furnace sludge, a by-product of zinc production, a by-product of iron production, and a by-product of copper production. The steel slag may include one or more of reduced steel slag, oxidized steel slag, converter steel slag, electrical arc furnace slag, basic oxygen furnace slag, ladle slag, fast-cooled steel slag, and slow-cooled steel slag. The providing of the composition at 202 may comprise providing the composition further comprising one or more of an accelerator, a retarder, a viscosity modifying agent, an air entertainer, a foaming agent, an alkali silica reaction inhibitor, an anti-wash-out, a corrosion inhibitor, a shrinkage reducer, a concrete crack reducer, a plasticizer, a super plasticizer, a sealer, a paint, a coating, a water reducer, a water repellant, an efflorescence controller, a polymer powder, a polymer latex, and a workability retainer. The providing of the composition at 202 may comprise providing the composition further comprising one or more of cellulose fibers, glass fibers, micro synthetic fibers, natural fibers, polypropylene fibers, polyvinyl alcohol fibers, and steel fibers.

Accordingly, carbonated precast concrete suitable for the described post-hardening treatment can be made of cementitious, limited cementitious and/or non-cementitious binders. These binders can have strong hydraulic activity, such as any or a combination of the following materials: ordinary Portland cement (OPC), high alumina cement, white cement, magnesium cement, OPC blended with limestone or supplementary cementitious materials including ground granulated blast furnace slag (GGBFS), fly ash, and natural and calcined pozzolanic materials. These binders can also have poor or no hydraulic activity, such as any or a combination of the following materials: calcium hydroxide, GGBFS, steel slags, stainless steel slags, fly ash, non-hydraulic cement, and other materials that are rich in CaO, and/or MgO, and/or $Ca(OH)_2$, and/or $Mg(OH)_2$ contents. These binders can also be a combination of materials with hydraulic and poor or no hydraulic activity. Preferably, the binder that is suitable for manufacturing carbonated precast concrete subject to the described post-hardening treatment contains at least 10% by weight materials with poor or no hydraulic activity. More preferably, the binder that is suitable for manufacturing carbonated precast concrete subject to the described post-hardening treatment contains at least 25% by weight materials with poor or no hydraulic activity. More preferably, the binder that is suitable for manufacturing carbonated precast concrete subject to the described post-hardening treatment contains at least 50% by weight materials with poor or no hydraulic activity. More preferably, the binder that is suitable for manufacturing carbonated precast concrete subject to the described post-hardening treatment contains at least 75% by weight materials with poor or no hydraulic activity. More preferably, the binder that is suitable for manufacturing carbonated precast concrete subject to the described post-hardening treatment contains at least 100% by weight materials with poor or no hydraulic activity.

As shown in the examples below, steel slag can be used herein as the sole component of a binder for carbonated precast concrete production. "Steel slag" herein refers to the slag by-product produced from making steel. Steel slag may include slag produced from Basic Oxygen Furnaces (BOF), also known as slag from the Linz-Donawitz (LD) process, or LD slag. Steel slag may also include slag produced from Electric Arc Furnaces (EAF). Steel slag as used herein may further include ladle slag, which is produced as a by-product from a ladle refining operation. Steel slag as used herein may further include stainless steel slag generated from stainless steel production, which is mainly generated from the argon oxygen decarburization (AOD) and/or ladle metallurgy (LM) process. In addition, steel slag can be a combination of above slags. For example, "EBH slag" as used herein refers to EAF-BOF Hybrid, which is a type of steel slag formed of a mixture of EAF and BOF produced slags.

In one embodiment, the steel slag used herein has a cumulative calcium silicate content (ex: $CS+C_2S+C_3S$ phase concentration) of at least about 15% by weight. In one embodiment, the steel slag used herein has a cumulative calcium silicate content (ex: $CS+C_2S+C_3S$ phase concentration) of at least about 20% by weight. In one embodiment, the steel slag used herein has a cumulative calcium silicate content (ex: $CS+C_2S+C_3S$ phase concentration) of at least about 30% by weight. In one embodiment, the steel slag used herein has a cumulative calcium silicate content (ex: $CS+C_2S+C_3S$ phase concentration) of at least about 40% by weight. In one embodiment, the steel slag used herein has a $SiO_2$ content of at least about 6% or more preferably at least about 15% by weight.

The steel slag may include a mixture of coarse slag pieces and fine slag pieces. Coarse slag pieces may have a Blaine fineness less than about 50 $m^2/kg$ and fine slag pieces may have a Blaine fineness greater than about 50 $m^2/kg$. The coarse slag pieces, the fine slag pieces, or both may be land-filled as an outcome from typical steel making process. Received steel slag originating from waste (such as land-fill and/or industrial waste) may optionally be refined. Refining the steel slag may include filtering the received steel slag to separate fine slag pieces from coarse slag pieces. Alternatively, or additionally, refining the received steel slag may also include pulverizing the steel slag to a fine powder. In some exemplary embodiments, the filtered fine pieces are pulverized while coarser pieces are not pulverized. For example, for EAF steel slag, the slag may be pulverized to a Blaine fineness of at least 50 $m^2/kg$, and preferably about 180 $m^2/kg$. For example, for EBH steel slag (mix of EAF and BOF and ladle slag), the slag may be pulverized to a Blaine fineness of at least 100 $m^2/kg$ and preferably about 240 $m^2/kg$. In other exemplary embodiments, the steel slag may be pulverized to a finer size. In another example, at least fifty percent of ground slag may be smaller than 100 microns, and at least ten percent of ground slag may be smaller than 50 microns, i.e., D(50)<100 microns, and D(10)<50 microns.

It will be understood that "steel slag" as used herein excludes iron slag and blast furnace slag that are typically generated during iron production and that may be used in making cement, such as pozzolanic slag.

Various types of aggregate including natural or artificial normal weight and lightweight aggregates can be incorporated into the dry or wet concrete product as filler in the production of concrete product. Examples of potential lightweight aggregates includes natural lightweight aggregate (e.g. pumice), expanded clay aggregate, expanded shale aggregate and expanded iron slag aggregate. Other usable aggregates include: crushed stone, manufactured sand, gravel, sand, recycled aggregate, granite, limestone, quartz, chalk powder, marble powder, quartz sand and artificial aggregate. These aggregates are incorporated into the mix as fine and/or coarse aggregates. Aggregate content can be as high as 90% of the weight concrete composition.

In some embodiments, the providing of the composition includes providing the composition including one or more chemical admixture and/or one or more mineral.

In some embodiments, the providing of the composition at 202 includes providing a composition being free of a slag. The providing of the composition at 202 may include providing the composition including the binder including one or more of fly ash, calcinated shale, silica fume, zeolite, ground granulated blast furnace slag, limestone powder, hydraulic cements, and non-hydraulic cements.

In some embodiments, the providing of the composition at 202 includes providing the composition with the binder including slag, the slag including one or more of a steel slag, a stainless steel slag, a basic oxygen converter sludge, a blast furnace sludge, a by-product of zinc production, a by-product of iron production, and a by-product of copper production. The steel slag may include one or more of reduced steel slag, oxidized steel slag, converter steel slag, electrical arc furnace slag, basic oxygen furnace slag, ladle slag, fast-cooled steel slag, and slow-cooled steel slag.

The providing of the composition at 202 may comprise providing the composition with one or more of an accelerator, a retarder, a viscosity modifying agent, an air entertainer, a foaming agent, an alkali silica reaction inhibitor, an anti-wash-out, a corrosion inhibitor, a shrinkage reducer, a concrete crack reducer, a plasticizer, a super plasticizer, a sealer, a paint, a coating, a water reducer, a water repellant, an efflorescence controller, a polymer powder, a polymer latex, and a workability retainer. The providing of the composition at 202 may comprise providing the composition with one or more of cellulose fibers, glass fibers, micro synthetic fibers, natural fibers, polypropylene fibers, polyvinyl alcohol fibers, and steel fibers.

The binder material which is intended to be used may be reactive towards carbon dioxide. However, the binder may have some level of hydraulic properties. In other words, the binder may be reactive towards water.

In the embodiment shown, the step 204 of the mixing of the binder, the aggregate, and the water to produce the concrete mixture may include producing a wet mixture having a mixture water-to-binder ratio. The mixing of the binder, the aggregate, and the water to produce the concrete mixture at 204 may include producing a dry mixture having a different mixture water-to-binder ratio. There are many suitable ways to perform the mixing of the concrete mixture, for example with a mixing drum.

The mixing of the binder, the aggregate, and the water to produce the concrete mixture at 204 may include producing a wet mixture having a mixture water-to-binder ratio. The mixing of the binder, the aggregate, and the water to produce the concrete mixture at 204 may include producing a dry mixture having a different mixture water-to-binder ratio.

Herein, the imparting of the form to the concrete mixture at 206 includes casting the concrete mixture in a mould to provide a moulded intermediate. The method 200 of the present embodiment includes a step of demoulding the moulded intermediate to provide a demolded intermediate. In some embodiments, the carbon curing of the formed intermediate at 208 may include concurrently conditioning and curing the formed intermediate. In some embodiments, the concurrently conditioning and curing of the formed intermediate includes concurrently conditioning and curing the formed intermediate while the formed intermediate is still inside the mould.

At step 206, the imparting of the form to the concrete mixture may include forming and consolidating the concrete mixture under compaction and vibration to provide the formed intermediate. In some embodiments, the imparting of the form may include transferring the freshly prepared concrete mixture by any appropriate means and casting in a prepared mould. The mould may be made of steel, iron, aluminum, plastic, FRP or another material. The mould may be pre-lubricated prior to casting in order to facilitate the demoulding process. If using a wet mix, it may be consolidated within the mould by internal or external vibrators. In some cases, the consolidation step lasts no more than 120 seconds. Dry cast concrete may be compacted/pressed/pressurized/formed into the mould by compaction and or vibration. The imparting of the form at 206 may include casting the concrete mixture in a shape of a precast, a concrete pipe, a box culvert, a draining product, a paving slab, a floor slab, a traffic barrier, a wall manhole, a retaining wall, a paver, a tile, or a shingle.

In some embodiments, the method 200 may include demoulding the formed intermediate before the carbon curing at 208. The method may include conditioning the formed intermediate until a water-to-binder ratio, which corresponds to a first water-to-binder ratio after the imparting of the form at 206, reaches a second water-to-binder ratio lower than the first water-to-binder ratio. After the conditioning step, the conditioned intermediate may be demolded to provided a demolded conditioned intermediate. This demolded conditioned intermediate may then go through the carbon curing step at 208.

In some embodiments, the method 200 includes inserting a reinforcing material inside the mould before the casting of the concrete mixture. The inserting of the reinforcing material may include inserting bars made of the reinforcing material, the reinforcing material including one or more of carbon steel, stainless steel, and fiber reinforced polymer.

Post-Hardening

In the embodiment shown, the exposing of the cured intermediate to the temperature above the ambient temperature at 210 includes exposing the cured intermediate to the temperature being at least 30 degrees Celsius. Preferably, the cured intermediate is exposed to a temperature being from at least 40 to 150 degrees Celsius, preferably, from 80 to 100 degrees Celsius.

In some embodiments, the exposing of the cured intermediate to the temperature at 210 may include increasing a temperature of the chamber 12A containing the cured intermediate at a rate ranging from 20 to 120 degrees Celsius per hour. Then, the temperature inside the curing chamber may be maintained above at least 30 degrees Celsius. The exposing of the cured intermediate to the temperature above the ambient temperature at 210 may include exposing the cured intermediate to an environment having a relative humidity of from 10% to 90%. The exposing of the cured intermediate to the temperature above the ambient temperature at 210 may include exposing the cured intermediate to the temperature for from 1 hour to 72 hours, preferably for at least 6 hours.

In some embodiments, the exposing of the cured intermediate to the temperature above the ambient temperature at 210 is performed immediately after the carbon curing of 208. Alternatively, the cured intermediate may be stored at suitable conditions before the exposing of the cured intermediate to the temperature above the ambient temperature at 210.

This post-hardening treatment is an additional step to the carbonation step in precast concrete production in order to strengthen $CO_2$ cured concrete products. It is generally believed that the durability, such as freeze-thaw resistance, of a strengthened precast concrete should also be improved. Therefore, this added step can enhance the mechanical properties and durability of carbonated precast concrete and/or reduce the material cost in its production.

Post-hardening treatment as described in the current disclosure is executed on already carbonated precast concrete. During the post-hardening treatment, carbonated precast concrete is exposed to a temperature higher than ambient temperature for a specified period. In other words, carbonated precast concrete is baked under heat for a specified period after carbonation curing. The temperature used for treating carbonated precast concrete can be 40° C. up to 150° C. A treating temperature of 80° C. or higher is preferred. In some cases, a treating temperature of 100° C. or higher is preferred. To reach the specified treating temperature, the temperature increasing rate can be 20-120° C./hour at the beginning of the post-hardening treatment. After the specified treating temperature is reached, it can be maintained until the post-hardening treatment is completed. Alternatively, carbonated precast can be loaded into the treatment enclosure after the enclosure has been heated up to the specified temperature. The duration of post-hardening treatment can be 1 hour or longer. The duration of post-hardening treatment is more preferred to be 6 hours or longer but shorter than 72 hours. During the post-hardening treatment, the relative humidity surrounding carbonated precast concrete can be 10% up to 90%. Detailed temperature and duration of post-hardening treatment depends on the types of raw materials especially the types of binders, percentage of binders, thickness of products, concrete mix proportions, relative humidity, the degree of carbonation curing and the desired performance for the treated carbonated precast concrete.

In some embodiments, the post-hardening treatment is preferred to start after the carbonation curing of precast concrete is completed without delay. However, post-hardening treatment can also be conducted after carbonated precast concrete is stored under normal condition for an unspecified period.

In some embodiments, the post-hardening treatment is preferred to be carried out in the chamber where carbonation curing takes place. However, post-hardening treatment can be carried out in another enclosure after carbonated precast concrete is removed from the carbonation curing chamber. During the post-hardening treatment, the treatment enclosure can be sealed or un-sealed, although a sealed enclosure is preferred.

Heating during the post-hardening treatment can be achieved through conventional methods, such as gas or oil burner, boiler, infrared heating element, and so on. In another embodiment, the heat generated during the carbonation curing process can be recycled and re-used for the post-heat treatment process. An air circulation system is needed to bring hot air from the heat source to the treatment enclosure, and also evenly distribute heat surrounding carbonated precast concrete. This air circulation system may also have the function of taking the accumulated moisture in the air out of the treatment enclosure, if it is desired.

The performance enhancement of carbonated precast concrete by the current post-hardening treatment is believed to be the result of the generation of bigger and stronger calcium carbonate particles in carbonated precast concrete after post-hardening treatment. In other words, more crystalized calcium carbonates are generated inside carbonated precast concrete due to the post-hardening treatment, which contribute to the enhanced mechanical and durability properties. In addition, some of unreacted dissolved calcium ions and carbonic acid in carbonated precast concrete may get a chance to react once the temperature goes up, thus increasing the strength and durability of carbonated precast concrete. Furthermore, some of the uncarbonated dissolved calcium silicates may hydrate under elevated temperature, which contributes to the strength development of carbonated precast concrete. Additionally, the structure and crystallinity of the generated calcium carbonates during the carbonation curing process can be improved, resulting in an improved microstructure and structure as a result of the proposed post-hardening treatment.

The post-hardening treatment includes exposing the precast concrete to a heat treatment to a temperature of at least 30° C. to obtain the concrete product. In some embodiments, the post-hardening treatment has a duration of at least 1, 2, 3, 4, 5, 6, 8, 10, 12, 18 or 24 hours and may have an upper boundary of 72 hours. In some embodiments, the post-hardening treatment is performed at a temperature of at least 35° C., at least 40° C., at least 45° C., at least 50° C., at least 55° C., at least 60° C., at least 65° C., at least 70° C., at least 75° C., at least 80° C., at least 85° C., at least 90° C., at least 95° C., at least 100° C., from 30 to 150° C., from 40 to 150° C., from 50 to 150° C., from 60 to 150° C., from 70 to 150° C., from 80 to 150° C., or from 80 to 110° C.

Below are some examples with a purpose to demonstrate that desirable characteristics may be obtained by the post-hardening treatment of carbonated precast concrete using the methods of the present disclosure. Neither the raw materials nor the processes will be limited to the ones given in these examples.

These examples may demonstrate that desirable characteristics may be obtained by the post-hardening treatment of carbonated precast concrete using the methods of the present disclosure. Accordingly, as demonstrated below, there is further provided a post-hardening treatment process 200 comprising the steps of providing a carbonated precast concrete 202 and heat treating 204 the carbonated precast concrete at a temperature of from 30 to 150° C. to obtain a strengthened concrete. The carbonated precast concrete can be produced by the steps described herein or other methods known in the art.

Moisturizing

Prior to post-hardening treatment, or alternately currently with the post-hardening treatment, the carbonated precast concrete can be moisturized. This moisturizing step may include, for example; submerging the cured intermediate in water; spraying the cured intermediate with water; and/or misting the cured intermediate with water. In certain embodiments, therefore, the cured intermediate is moisturized by being soaked in tap water or water saturated with hydrated lime for a period not longer than 24 hours, or by being sprinkled, sprayed and/or misted with tap water. In certain embodiments, this moisturizing is performed for period of time of from 0.5 to 48 hours. The preferred moisture content increase for the moisturized carbonated precast concrete is 0.5% by weight or higher. There can be a delay of up to 24 hours between the proposed moisturizing step and the followed post-hardening treatment. Such a moisturizing step can be advantageous for carbonated precast concrete made of a binder with hydraulic activity. Optionally, water used for soaking/spraying can contain minerals/chemicals like efflorescence reducer admixture or water repellent. Alternatively, carbonated precast concrete can be surrounded by water vapour during the post-hardening treatment.

At step 208, a carbon curing of the precast concrete is performed to obtain a carbonated precast concrete. In some embodiments, the carbonation reaction between calcium-rich materials and carbon dioxide occurs once calcium leached from the material and $CO_2$ are dissolved in water. In a concrete sample, the reaction generally happens at a specified pore saturation. Once the pores are filled with water and the saturation rate is at or near 100%, there is little to no reaction between slag and carbon dioxide. This observation is also valid when there is no water in the pore, or where the pore saturation is zero percent. The optimum pore saturation, or in simpler terms, the moisture content of the mix, results in the highest carbonation reaction rate. Diverging from the optimum moisture content may lead to a lower carbonation reaction and lower concrete performance.

In some embodiments, prior to the post-hardening treatment at step 210, carbonated precast concrete can be wet or moisturized. In some embodiments, the carbonated precast concrete is soaked in tap water or water saturated with hydrated lime for a period not longer than 24 hours, or by being sprinkled with tap water. The preferred moisture content increase for the moisturized carbonated precast concrete is 0.5% by weight or higher, for example at least 0.55%, at least 0.6%, at least 0.65%, at least 0.7%, or at least 0.75%. There can be a delay of up to 24 hours between the optional wetting/moisturizing step and the followed post-hardening treatment 210. The described wetting or moisturizing step can be advantageous for carbonated precast concrete made of a binder with hydraulic activity. Optionally, water used for soaking/spraying can contain minerals/chemicals like efflorescence reducer admixture or water repellent. Alternatively, carbonated precast concrete can be surrounded by water vapour during the post-hardening treatment. Therefore, in some embodiments the steps of moisturizing and curing may overlap or may occur concurrently.

In some embodiments, during the water absorption testing, carbonated precast concrete is immersed in water for 24 hours and then oven-dried for not less than 24 hours at 100-115° C.

Concurrent Conditioning & Curing

The method 200 may include concurrently conditioning and curing the formed intermediate. This may comprise conditioning the formed intermediate while curing the formed intermediate, wherein the formed intermediate is concurrently cured and conditioned to obtain final water-to-binder ratio less than the first water-to-binder ratio. In other words, while the formed intermediate is being cured, a water content of the formed intermediate decreases from the first water-to-binder ratio to a final water-to-binder ratio. Stated differently, the concurrent conditioning and curing may include conducting a curing process of the formed intermediate, the curing process being initiated at a first time and completed at a second time, and conditioning the formed intermediate between the first time and the second time.

Herein, the expression "concurrent" denotes that two processes occur at the same time, simultaneously. In other words, while the formed intermediate is being cured, some water is being evaporated out of it as part of the conditioning process. Typically, the water-to-binder ratio is constant during the curing process because the water that is not required for the concrete composition has been removed during the conditioning process which is performed before the curing process. In the present method 200, the curing of the formed intermediate occurs while, at the same time, excess water is being evaporated out of the formed intermediate.

In the embodiment shown, the step of concurrently conditioning and curing the formed intermediate may include inserting the formed intermediate in the enclosure 12 sealed from an environment outside the enclosure 12. Then, carbon dioxide at a concentration being at least 5% by volume is injected in the enclosure 12. Other concentrations are contemplated. In the present embodiment, the step of concurrently conditioning and curing the formed intermediate includes absorbing water evaporated from the formed intermediate during the concurrent conditioning and curing. The absorbing of the water evaporated from the formed intermediate may include absorbing the water with a desiccant material contained within the enclosure 12. In some embodiments, a dehumidifier may be used to extract humidity from the enclosure 12. The concurrent conditioning and curing at 208 may be performed free of additional external sources of heat and/or free of pressure (e.g., mechanical pressure).

In the embodiment shown, the moisture content and/or water content of the concrete mixture may be reduced from high moisture content to the optimum moisture content, and may even go below the optimum moisture content required for the carbonation reaction. The presence of carbon dioxide inside the enclosure (chamber/enclosed environment/vessel) 12 during the concurrent conditioning and curing process at 208 may result in a calcium carbonate precipitation that may improve strength development in concrete products. In other words, the accelerated carbonation curing occurs while the relative humidity of the chamber 12A of the enclosure 12 is kept low. Any precast concrete products, including but not limited to concrete masonry units, paving stones, retaining walls, slabs, traffic barriers, pipes, culverts, etc., can be produced with the proposed process.

In the current disclosure, the pore saturation may be reduced during concurrent conditioning and carbonation curing at 208. The fresh concrete products are dried or semi-dried with the help of reduced relative humidity. Low RH can be obtained by the presence of absorbent materials and/or elevated temperature combined with air flow (e.g., with the blower 17) inside the chamber for better efficiency. In some embodiments, the air flow speed generated by the blower 17 or other suitable means may be at least 0.1 m/s. The absorbent or desiccant materials may be silica gel, clay, calcium oxide, calcium chloride, molecular sieve, activated charcoal, any other industrial absorbents or a combination of any of these. The presence of the absorbent in an enclosed environment with air flow generated by the fan or blower 17 or by other means may gradually reduce the moisture content of the fresh concrete. The circulated air can be cold or hot. The RH inside the chamber 12A may also be lowered using any mechanical equipment including dehumidifiers that use heating and ventilation or condensation methods for extracting water from the air.

Air circulation rate can vary during the concurrent conditioning and curing at 208. In some cases, the blower 17 may be non-operational (e.g., no air flow). This implies that the carbon dioxide inside the enclosure 12 is stationary. This may be done with the controller 20 varying a rotational speed of the blower 17. The amount of absorbent materials 21 required may depend on the type of material used, the total water content in the concrete products, the type of concrete products and the required or target specifications sought. The fresh air can be introduced into the chamber 12A from outside the chamber, or in another embodiment from inside the closed chamber. In other words, a port 12B (FIG. 1) may be provided to insert air through one of the walls of the enclosure 12. The simultaneous conditioning and $CO_2$ curing process at 208 may further continue to reduce the moisture content of concrete products even after the carbonation reaction stops. The absorbent materials 21 may be used for several cycles. The absorbent materials may be replaced by new materials after they lose their capacity for capturing moisture from the air. The absorbent materials can be placed in any position inside the chamber, or can be distributed uniformly inside the chamber.

In another embodiment, the concurrent conditioning and curing step at 208 may be executed by introducing and circulating high-temperature air. If the hot and dry air is introduced into the chamber, the utilization of absorbent materials will be optional.

In another example, the air inside the chamber may be heated by elements, heaters and other known means. If the air inside the chamber is heated up, the utilization of absorbent materials may be optional. In another embodiment, the body of the chamber may heated by external heating blanket and other known means in prior art. If the body of the chamber is heated up while the $CO_2$ curing process is underway, the utilization of absorbent materials will be optional. A combination of one or two of the above conditioning methods can be implemented.

The demoulded fresh concrete may be contacted with carbon dioxide, $CO_2$ or a gas containing $CO_2$ while its moisture content is reduced during the simultaneous water extraction and $CO_2$ curing process. The carbon dioxide gas introduced to cure the concrete is at 5%, preferably 10%, preferably 20%, preferably 30%, preferably 40%, preferably 50%, preferably 60%, preferably 70%, preferably 80%, preferably 90%, or preferably 99.5% purity. The gauge pressure of the gas will gradually increase to a range of 0.1 psi and optionally to 100 psi.

The concrete products may be kept under conditioning and $CO_2$ pressure for a given time limit, which may be at least 10 minutes, though the simultaneous conditioning and $CO_2$ curing process at 208 may continue for up to 48 hours.

The concurrently conditioning and curing of the formed intermediate at 208 may include concurrently conditioning and curing the formed intermediate free of additional external sources of heat and/or pressure.

In some embodiments, the drying rate can be varied in the presence of carbon dioxide during the concurrent conditioning and curing at step 208. Drying variation may be provided by different means such as airflow having a varying speed, temperature variation, or relative humidity variation (by one or more of a desiccant material and mechanical means).

The step of concurrent conditioning and curing at 208 may be achieved without additional external source of heat. In some embodiments, the step of concurrent conditioning and curing at 208 may be achieved with additional external source of heat.

At step 202, various types of aggregates including natural or artificial normal weight and lightweight aggregates can be provided as filler in the production of the hardened concrete of the present disclosure. Examples of potential lightweight aggregates include but are not limited to natural lightweight aggregate (e.g. pumice), expanded clay aggregate, expanded shale aggregate and expanded iron slag aggregate. Other usable aggregates include but are not limited to: crushed stone, manufactured sand, gravel, sand, recycled aggregate, granite, limestone, quartz, chalk powder, marble powder, quartz sand and artificial aggregate. These aggregates can be incorporated into the mix as fine and/or coarse aggregates. The aggregate content in the concrete mixture can be as high as 90% of the weight concrete the concrete mixture.

EXAMPLES

Example 1—Post-Hardening Treatment of Carbonated Precast Concrete Made with Different Slag Contents Precast concrete samples were prepared with the binder contents shown in Table 1. The binder used was steel slag, more specifically a mixture of EAF and BOF slag was used. It was refined to a required fineness before being used as binder. It had a cumulative calcium silicate content of at least about 2%, a calcium oxide content of at least 20%, and a silicon dioxide content of at least about 6%. Its specific gravity was 3.4. The normal weight aggregate used was crushed stone with a specific gravity of 2.7 and 100% passing 4.76 mm (No. 4) sieve. Its moisture content and water absorption were 0.25% and 0.75%, respectively. Compressed $CO_2$ gas in cylinders with a purity >99.9% was used for carbonation curing.

The binder and aggregate were mixed together in a mixer for 5 minutes, with sufficient amount of tap water added during this period to obtain the required workability. The obtained concrete mixture was formed and consolidated under compaction and vibration to the desired density. After being demolded, precast concrete samples were conditioned with a fan blower to lose about 20-80% of its initial moisture content. After that, the conditioned precast concrete samples were loaded into a pressure chamber for accelerated carbonation curing. Adjusted to a pressure of 9-15 psi, carbon dioxide gas was introduced into the sealed pressure chamber. The duration of carbonation curing varied from 4 hours to 24 hours. After carbonation curing, the comparison samples were assessed immediately for their compressive strength, following ASTM C140 (Standard Test Methods for Sampling and Testing Concrete Masonry Units and Related Units). The other carbonated precast concrete samples were subjected to a post-hardening treatment: at first, they were fully submerged in tap water at 20° C. for 24 hours; after that, they were taken out of the water tank and then dried in an oven at 110° C. for 24 hours; their compressive strength was then evaluated after they were taken out of the oven and completely cooled to room temperature. For each numbered sample in Table 1, two replicates were made. The average strength, density and $CO_2$ uptake of each numbered sample are provided in Table 1.

TABLE 1

Sample Processing Parameters and Testing Results

| Sample ID | Binder Content | $CO_2$ Curing Pressure (psi) | $CO_2$ Curing Time (hour) | Post-hardening Treatment | Testing Results | | | |
|---|---|---|---|---|---|---|---|---|
| | | | | | $CO_2$ Uptake | Density (kg/m³) | Strength (MPa) | Strength Increase |
| Comparison 1 | 20% | 15 | 16 | No | 15.6% | 2295 | 22.1 | — |
| 1 | 20% | 15 | 16 | Yes | 15.4% | 2280 | 27.7 | 25% |
| Comparison 2 | 25% | 15 | 4 | No | 10.9% | 2352 | 15.7 | — |
| 2 | 25% | 15 | 4 | Yes | 11.2% | 2362 | 27.1 | 73% |
| Comparison 3 | 30% | 15 | 4 | No | 9.4% | 2445 | 19.0 | — |
| 3 | 30% | 15 | 4 | Yes | 9.3% | 2410 | 26.0 | 37% |
| Comparison 4 | 30% | 9 | 16 | No | 10.5% | 2484 | 25.8 | — |
| 4.1 | 30% | 9 | 16 | Yes | 9.9% | 2332 | 45.8 | 78% |
| 4.2 | 30% | 9 | 24 | Yes | 15.0% | 2382 | 54.6 | 112% |
| Comparison 5 | 30% | 12 | 16 | No | 11.9% | 2481 | 32.0 | — |

TABLE 1-continued

Sample Processing Parameters and Testing Results

| Sample ID | Binder Content | $CO_2$ Curing Pressure (psi) | $CO_2$ Curing Time (hour) | Post-hardening Treatment | Testing Results | | | |
|---|---|---|---|---|---|---|---|---|
| | | | | | $CO_2$ Uptake | Density (kg/m$^3$) | Strength (MPa) | Strength Increase |
| 5.1 | 30% | 12 | 16 | Yes | 14.3% | 2455 | 53.0 | 66% |
| 5.2 | 30% | 12 | 24 | Yes | 15.1% | 2416 | 58.5 | 83% |
| Comparison 6* | 50% | 15 | 24 | No | 11.2% | 2399 | 57.0 | — |

Note:
Comparison 6 contains 0.6% additives (by weight), which are air entraining admixture and water repellent admixture.

The strength increase of carbonated precast concrete was significant after post-hardening treatment. As show in Table 1, for carbonated precast concrete made with 20% binder content, its average compressive strength was increased from 22.1 MPa to 27.7 MPa after post-hardening treatment, an increase of 25%. For carbonated precast concrete made with 25% binder content, its average compressive strength was increased from 15.7 MPa to 27.1 MPa after post-hardening treatment, an increase of 73%. With the help of the post-hardening treatment, carbonated precast concrete with 20% or 25% binder content can be stronger than sample Comparison 3 which had 30% slag content.

For carbonated precast concrete made with 30% binder content, the strength increase after post-hardening treatment was between 37% and 112%, varying with $CO_2$ curing condition. With the help of post-hardening treatment, the average strength of carbonated precast concrete with 30% binder content can be greater than 50 MPa. Such a high strength often required a binder content of 50% for carbonated precast concrete without post-hardening treatment, as demonstrated by sample Comparison 6 in Table 1. The obtained results showed that the binder content of carbonated precast concrete can be saved by up to 40% while maintaining its strength, when post-hardening treatment is applied.

Example 2—Post-Hardening Treatment of Carbonated Precast Concrete at Different Treatment Temperature and Duration More precast concrete samples were prepared with the binder content shown in Table 2. The binders used were both EAF steel slags, but from different suppliers. The slags were refined to the require fineness before being used as binders. Each binder had a cumulative calcium silicate content of at least about 20%, a calcium oxide content of at least 20%, and a silicon dioxide content of at least about 6%. The aggregate and $CO_2$ gas used were the same as those used in Table 1.

The binder and aggregate were mixed together in a mixer for 5 minutes, with sufficient amount of tap water added during this period to obtain the required workability. The obtained concrete mixture was formed and consolidated under compaction and vibration to the desired density. After being demolded, precast concrete samples were conditioned with a fan blower to lose about 20-80% of its initial moisture content. After that, the conditioned precast concrete samples were loaded into a pressure chamber for accelerated carbonation curing. Adjusted to a pressure of 6 psi, carbon dioxide gas was introduced into the sealed pressure chamber. The duration of carbonation curing was set to 19 hours. After carbonation curing, the comparison samples were assessed immediately for their compressive strength, following ASTM C140. The other carbonated precast concrete samples were subject to post-hardening treatment: for most samples, they were dried in an oven at 40-110° C. for 6 or 24 hours; for samples 8.5 and 8.6, they were immersed in water for 24 hours before they were dried in an oven at 100° C. or 110° C. for 24 hours. The compressive strength of the samples with post-hardening treatment was assessed after they were taken out of the oven and completely cooled to room temperature. For each numbered sample in Table 2, three replicates are made. The average strength, density and $CO_2$ uptake of each numbered sample are provided in Table 2.

TABLE 2

Second Sample Processing Parameters and Testing Results

| Sample ID | Binder Content | Post-hardening Treatment | Treatment Conditons | | Testing Results | | | |
|---|---|---|---|---|---|---|---|---|
| | | | Duration (hour) | Temperature (° C.) | $CO_2$ Uptake | Density (kg/m$^3$) | Strength (MPa) | Strength Increase |
| Comparison 7 | 30% | No | — | — | 12.4% | 2304 | 26.0 | — |
| 7.1 | 30% | Yes | 6 | 40 | 13.0% | 2323 | 30.2 | 16% |
| 7.2 | 30% | Yes | 6 | 60 | 12.7% | 2317 | 27.2 | 5% |
| 7.3 | 30% | Yes | 6 | 80 | 12.5% | 2331 | 32.5 | 25% |
| 7.4 | 30% | Yes | 6 | 100 | 11.6% | 2357 | 34.2 | 31% |
| 7.5 | 30% | Yes | 6 | 110 | 12.6% | 2338 | 37.4 | 44% |
| 7.6 | 30% | Yes | 24 | 60 | 13.0% | 2318 | 34.5 | 33% |
| 7.7 | 30% | Yes | 24 | 100 | 11.4% | 2406 | 29.7 | 14% |
| 7.8 | 30% | Yes | 24 | 110 | 12.7% | 2272 | 37.0 | 42% |
| Comparison 8 | 30% | No | — | — | 11.2% | 2228 | 42.2 | — |
| 8.1 | 30% | Yes | 24 | 60 | 11.7% | 2389 | 52.5 | 24% |
| 8.2 | 30% | Yes | 24 | 80 | 11.0% | 2224 | 48.5 | 15% |

TABLE 2-continued

Second Sample Processing Parameters and Testing Results

| Sample ID | Binder Content | Post-hardening Treatment | Treatment Conditons | | Testing Results | | | |
|---|---|---|---|---|---|---|---|---|
| | | | Duration (hour) | Temperature (° C.) | $CO_2$ Uptake | Density (kg/m$^3$) | Strength (MPa) | Strength Increase |
| 8.3 | 30% | Yes | 24 | 100 | 10.7% | 2210 | 56.7 | 35% |
| 8.4 | 30% | Yes | 24 | 110 | 11.3% | 2413 | 64.6 | 53% |
| 8.5* | 30% | Yes | 24 | 100 | 11.6% | 2390 | 58.1 | 38% |
| 8.6* | 30% | Yes | 24 | 110 | 11.2% | 2257 | 64.0 | 52% |

Note:
Samples 8.5 and 8.6 are immersed in water for 24 hours after carbonation curing, and then dried at 100° C. and 110° C., respectively.

A significant increase in the compressive strength of carbonated precast concrete was observed with post-hardening treatment, as shown in Table 2. For sample Comparison 7, its average compressive strength was 26.0 MPa. After 6 hours of post-hardening treatment at 40-110° C. temperature, its strength was increased up to 37.4 MPa, an increase of 16-44%. Similar degrees of strength increase were observed when it was subjected to post-hardening treatment at 60-110° C. for 24 hours. For sample Comparison 8, its average compressive strength was 42.2 MPa. After 24 hours of post-hardening treatment at 60-110° C., its strength was increased up to 64.6 MPa, an increase of 15-53%. Post-hardening treatment in the form of water immersion before heating had the same effect as simply heating without water immersion on the strength of carbonated precast concrete in this case.

From Table 2, it can also be determined that increasing heating temperature during the post-hardening treatment generally has a better effect on the strength increase of carbonated precast concrete.

Example 3—Post-Hardening Treatment of Carbonated Precast Concrete at Different Slag Contents and Different Treatment Temperature and Duration More precast concrete samples were prepared with the binder contents shown in Table 3. The binder used was a ladle slag. The slag was refined to the require fineness before being used as binder. The binder had a cumulative calcium silicate content of at least about 20%, a calcium oxide content of at least 20%, and a silicon dioxide content of at least about 6%. The aggregate and $CO_2$ gas used are the same as those used for Table 1.

The binder and aggregate were mixed together in a mixer for 5 minutes, with sufficient amount of tap water added during this period to obtain the required workability. The obtained concrete mixture was formed and consolidated under compaction and vibration to the desired density. After being demolded, precast concrete samples were conditioned with a fan blower to lose about 20-80% of its initial moisture content. After that, the conditioned precast concrete samples were loaded into a pressure chamber for accelerated carbonation curing. Adjusted to a pressure of 6 psi, carbon dioxide gas was introduced into the sealed pressure chamber. The duration of carbonation curing was set to 19 hours. After carbonation curing, the comparison samples were assessed immediately for their compressive strength, following ASTM C140. The other carbonated precast concrete samples were subject to post-hardening treatment: for most samples, they were dried in an oven at 80-110° C. for 24 hours; for samples 9.4 and 9.5, they were immersed in water for 24 hours before they were dried in an oven at 100° C. or 110° C. for 24 hours. The compressive strength of the samples with post-hardening treatment was assessed after they are taken out of the oven and completely cooled to room temperature. For each numbered sample in Table 3, four replicates were made. The average strength, density and $CO_2$ uptake of each numbered sample are provided in Table 3.

TABLE 3

Third Sample Processing Parameters and Testing Results

| Sample ID | Binder Content | Post-hardening Treatment | Treatment Conditons | | Testing Results | | | |
|---|---|---|---|---|---|---|---|---|
| | | | Duration (hour) | Temperature (° C.) | $CO_2$ Uptake | Density (kg/m$^3$) | Strength (MPa) | Strength Increase |
| Comparison 9 | 30% | No | — | — | 12.6% | 2444 | 43.9 | — |
| 9.1 | 30% | Yes | 24 | 80 | 12.6% | 2368 | 51.1 | 16% |
| 9.2 | 30% | Yes | 24 | 100 | 12.6% | 2406 | 53.5 | 22% |
| 9.3 | 30% | Yes | 24 | 110 | 12.5% | 2350 | 55.9 | 27% |
| 9.4* | 30% | Yes | 24 | 100 | 12.7% | 2351 | 62.4 | 42% |
| 9.5* | 30% | Yes | 24 | 110 | 12.5% | 2404 | 66.7 | 52% |
| Comparison 10 | 50% | No | — | — | 12.2% | 2327 | 51.2 | — |
| 10.1 | 50% | Yes | 24 | 80 | 12.4% | 2316 | 61.5 | 20% |
| 10.2 | 50% | Yes | 24 | 100 | 12.3% | 2332 | 69.8 | 36% |
| 10.3 | 50% | Yes | 24 | 110 | 12.7% | 2290 | 64.5 | 26% |

Note:
Samples 9.4 and 9.5 are immersed in water for 24 hours after carbonation curing, and then dried at 100° C. and 110° C., respectively.

A significant increase in the compressive strength of carbonated precast concrete was observed with post-hardening treatment, as shown in Table 3. For sample Comparison 9, its average compressive strength was 43.9 MPa. After 24 hours of post-hardening treatment at 80-110° C. temperature, its strength was increased up to 55.9 MPa, an increase of 16-27%. When it was immersed in water and then subjected to heat treatment, a more significant increase in strength was observed. With the combination of water immersion and drying after carbonation curing, its strength was greater than 60 MPa, an increase of over 50%. For sample Comparison 10, its average compressive strength was 51.2 MPa. After 24 hours of post-hardening treatment at 80-110° C., its strength was increased up to 69.8 MPa, an increase of 20-36%.

As expected, the average strength of carbonated precast concrete samples Comparison 9 and 10, which were made of the same type of slag, was increased from 43.9 MPa to 51.2 MPa, when the slag content was increased from 30% to 50%. However, with the help of post-hardening treatment, almost all carbonated precast concrete with 30% binder content was stronger than Comparison 10. The obtained results have demonstrated that the binder content of carbonated precast concrete can be saved by up to 40% while maintaining or increasing its strength, when post-hardening treatment is applied.

From Table 3, it can also be determined that increasing heating temperature during the post-hardening treatment generally had a better effect on the strength increase of carbonated precast concrete.

The disclosed methods, including the post-hardening step carried after carbonation curing may improve properties of the concrete products. These properties may include, for instance, the durability, the compressive strength, and so on.

Figure 4:
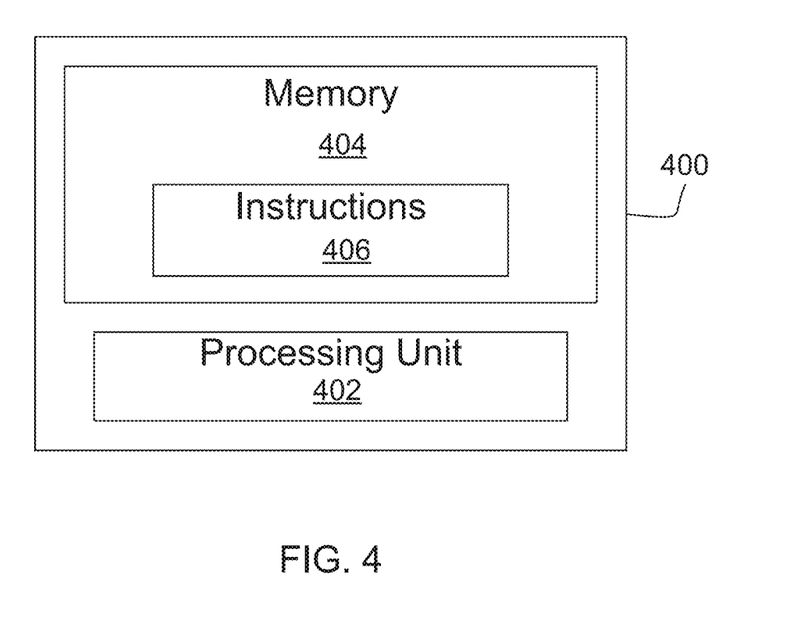
FIG. 4 is a schematic representation of a computing device to be used in a controller of the system of FIG. 1.

Referring now to FIG. 4, the controller 20 may include a computing device 400, which may comprise a processing unit 402 and a memory 404 which has stored therein computer-executable instructions 406. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

The methods and systems for operating the system 10 described herein may be implemented in a high level procedural or object oriented programming or scripting language, or a combination thereof, to communicate with or assist in the operation of a computer system, for example the computing device 400. Alternatively, the methods and systems for operating the system 10 may be implemented in assembly or machine language. The language may be a compiled or interpreted language. Program code for implementing the methods and systems for operating the system 10 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the system 10 may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skilled in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of manufacturing a concrete product, comprising:
    mixing a composition including a binder, an aggregate, and water to produce a concrete mixture;
    imparting a form to the concrete mixture to provide a formed intermediate;
    carbon curing the formed intermediate to obtain a cured intermediate until a $CO_2$ uptake of the cured intermediate is 9.9 to 15.4%; and
    performing a post-hardening treatment to the cured intermediate by exposing the cured intermediate to a temperature above an ambient temperature to obtain the concrete product.

2. The method of claim 1, wherein the exposing of the cured intermediate to the temperature above the ambient temperature includes exposing the cured intermediate to the temperature being at least 30 degrees Celsius.

3. The method of claim 2, wherein the exposing of the cured intermediate to the temperature includes exposing the cured intermediate to the temperature being from at least 40 to 150 degrees Celsius.

4. The method of claim 3, wherein the exposing of the cured intermediate to the temperature includes exposing the cured intermediate to the temperature being from at least 80 to 100 degrees Celsius.

5. The method of claim 1, wherein the exposing of the cured intermediate to the temperature includes increasing a temperature of a curing chamber containing the cured intermediate at a rate ranging from 20 to 120 degrees Celsius per hour.

6. The method of claim 5, comprising maintaining the temperature inside the curing chamber above at least 30 degrees Celsius.

7. The method of claim 1, wherein the exposing of the cured intermediate to the temperature above the ambient temperature includes exposing the cured intermediate to an environment having a relative humidity of from 10% to 90%.

8. The method of claim 1, wherein the exposing of the cured intermediate to the temperature above the ambient temperature includes exposing the cured intermediate to the temperature for from 1 hour to 72 hours.

9. The method of claim 8, wherein the exposing of the cured intermediate to the temperature above the ambient temperature includes exposing the cured intermediate to the temperature for from at least 6 hours.

10. The method of claim 1, wherein the exposing of the cured intermediate to the temperature above the ambient temperature is performed immediately after the carbon curing.

11. The method of claim 1, comprising storing the cured intermediate before the exposing of the cured intermediate to the temperature above the ambient temperature.

12. The method of claim 1, further comprising moisturizing the cured intermediate before the performing of the post-hardening treatment.

13. The method of claim 12, wherein the moisturizing comprises one of: submerging the cured intermediate in water; spraying the cured intermediate with water; and misting the cured intermediate with water.

14. The method of claim 12, wherein the moisturizing is performed concurrently with the performing of the post-hardening treatment.

15. The method of claim 12, wherein the moisturizing is performed for 0.5 to 48 hours.

16. The method of claim 1, further comprising conditioning the formed intermediate.

17. The method of claim 1, further comprising providing the binder to include one or more of fly ash, calcinated shale, silica fume, zeolite, ground granulated blast furnace slag, limestone powder, hydraulic cements, and non-hydraulic cements.

18. The method of claim 1, further comprising providing the binder to include slag, the slag including one or more of a steel slag, a stainless steel slag, a basic oxygen converter sludge, a blast furnace sludge, a by-product of zinc production, a by-product of iron production, and a by-product of copper production.

19. The method of claim 1, further comprising adding admixtures and/or additives to the composition.

20. A method of manufacturing a concrete product, comprising:
    obtaining a carbon cured intermediate having a compressive strength of 15.7 to 51.2 MPa, the carbon cured intermediate made using a binder requiring carbon dioxide for curing; and
    performing a post-hardening treatment to the carbon cured intermediate by exposing the carbon cured intermediate to a temperature above an ambient temperature to obtain the concrete product until the compressive strength is increased by 5% to 112%.

* * * * *